(12) United States Patent
Borcea

(10) Patent No.: US 7,555,905 B2
(45) Date of Patent: Jul. 7, 2009

(54) SELF-ACTUATING BLEED VALVE FOR GAS TURBINE ENGINE

(75) Inventor: Alexandru Borcea, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 487 days.

(21) Appl. No.: 11/391,076

(22) Filed: Mar. 28, 2006

(65) Prior Publication Data
US 2007/0234738 A1    Oct. 11, 2007

(51) Int. Cl.
*F02C 6/04* (2006.01)

(52) U.S. Cl. ............................ 60/785; 60/770; 215/279

(58) Field of Classification Search .............. 60/226.1, 60/770, 785, 226.3, 39.29, 39.07; 251/279, 251/301
See application file for complete search history.

(56) References Cited

U.S. PATENT DOCUMENTS

| | | | |
|---|---|---|---|
| 3,360,189 A | | 12/1967 | Cook |
| 3,511,576 A | * | 5/1970 | Cross et al. ................... 415/27 |
| 4,280,678 A | * | 7/1981 | Roberts ...................... 251/61.2 |
| 4,574,585 A | * | 3/1986 | Conn .......................... 60/795 |
| 5,477,673 A | * | 12/1995 | Blais et al. ..................... 60/785 |
| 6,122,905 A | * | 9/2000 | Liu ............................. 60/785 |
| 6,446,657 B1 | * | 9/2002 | Dziorny et al. .............. 137/219 |
| 6,701,716 B2 | * | 3/2004 | Rayer et al. ................... 60/782 |
| 6,883,331 B2 | * | 4/2005 | Jonsson et al. ................ 60/773 |
| 2005/0019156 A1 | * | 1/2005 | D'Angelo et al. ........... 415/144 |
| 2007/0089429 A1 | * | 4/2007 | Makuszewski ............... 60/785 |

* cited by examiner

*Primary Examiner*—Michael Cuff
*Assistant Examiner*—Phutthiwat Wongwian
(74) *Attorney, Agent, or Firm*—Carlson, Gaskey & Olds PC

(57) ABSTRACT

A bleed valve for bleeding air from a compressed air chamber at start-up of a gas turbine engine is self-actuated. The bleed valve moves between open and closed positions based on the pressure within a compressed air chamber. In this manner, the bleed valve is driven to an open position at low pressure conditions and to a closed position once the pressure within the compressor chamber becomes higher and closer to operating pressures. In this manner, a relatively inexpensive and simple bleed valve can be utilized to provide the start-up bleed valve function.

20 Claims, 3 Drawing Sheets

SELF-ACTUATING BLEED VALVE FOR GAS TURBINE ENGINE

BACKGROUND OF THE INVENTION

This application relates to a self-actuated bleed valve for assisting start-up of a gas turbine engine.

Gas turbine engines are provided with a number of functional sections, including a fan section, a compressor section, a combustion section, and a turbine section. Air and fuel are combusted in the combustion section. The products of the combustion move downstream, and pass over a series of turbine rotors, driving the rotors to provide power. The turbines drive the compressor and fan rotors.

At start-up, the turbine section of the gas turbine engine has not begun to fully provide power. Thus, driving the compressor, as an example, is more challenging than it will be at steady state conditions. It is known in prior art gas turbine engines to include a bleed valve to bleed air away from the compressor section during start-up and reduce the load to drive the compressor. Known bleed valves utilize some form of electric, pneumatic or hydraulic actuator to drive a valve between open and closed positions. The valve is powered open at start-up and powered to a closed position after start-up has been completed.

The powered valves are somewhat expensive and complex.

SUMMARY OF THE INVENTION

In a disclosed embodiment of this invention, a gas turbine engine compressor section is provided with a self-actuated bleed valve. Pressure is applied to two surfaces of a valve poppet, and the pressure within the compressor chamber itself is utilized to drive the valve poppet. At lower pressure conditions, such as found at start-up, the valve will move to an open position. A spring may assist in this positioning. As the compressor pressure increases, the valve poppet will move to a closed position and will remain at this closed position during most operational conditions. The present invention, by providing a valve actuated by the very working fluid, eliminates all of the complicated controls, etc. of the prior art powered valves. Thus, the present invention is less expensive and much simpler than the prior art.

While the present invention is disclosed solely as a start-up valve, it can also function in situations known as "handling" by adding a metering orifice. Handling, or alternating a position of the valve poppet between the open and closed positions, is required for various engine operating regimes, such as (but not limited to) ground idle, taxiing, take-off, climbing, cruising, and descent. A worker of ordinary skill in this art would recognize how the metering orifice would be included, as they have been included in the prior art powered valves.

In a disclosed embodiment of this invention, the self-actuated valve includes a valve poppet with a first certain area piston surface, and a second, opposed, smaller piston area. The second piston surface faces into a pressurized chamber communicating with the compressor section. The first piston surface faces an enclosed chamber. A hollowed rod guides the poppet movement and communicates pressurized air into the enclosed chamber. Since the chamber is closed, the enclosed chamber will solely see a static pressure. At lower pressure conditions, a total pressure applied on the second piston surface, plus a spring force, will overcome the force on the larger first piston surface in the enclosed chamber.

However, as the overall pressure within the pressurized chamber increases, the static pressure in the enclosed chamber will also increase, and eventually the force from the increasing pressure on the larger piston surface will become sufficiently high that it drives the valve poppet to the closed position. In this manner, the valve poppet is open at start-up and driven to be closed after the pressure has built up sufficiently from the compressor. When the valve is open, air from the compressor section is dumped, thus lowering the load to drive the compressor during start-up conditions.

These and other features of the present invention can be best understood from the following specification and drawings, the following of which is a brief description.

DETAILED DESCRIPTION OF THE PREFERRED EMBODIMENT

Figure 1:
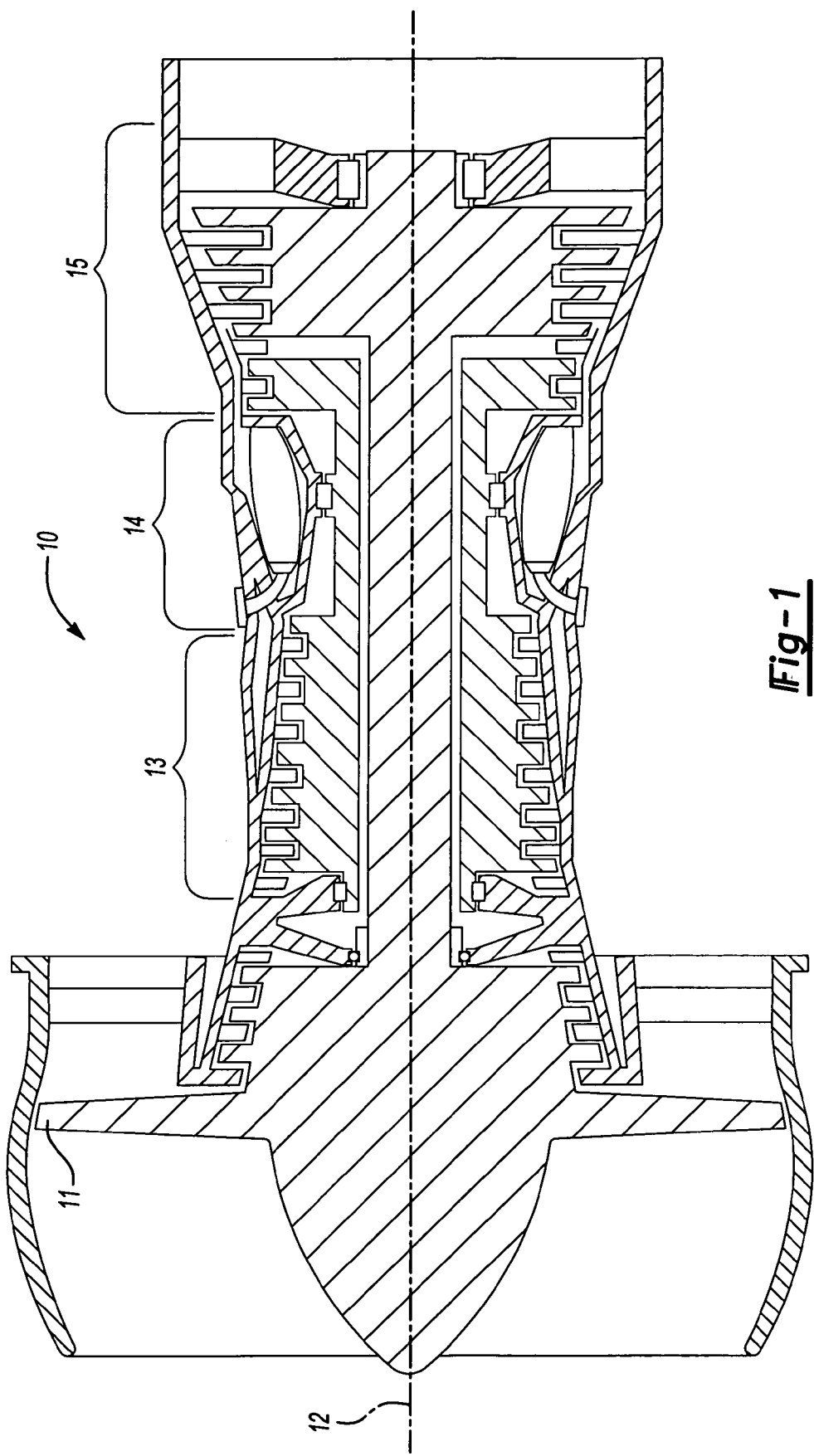
FIG. 1 is a schematic view of a gas turbine engine.

FIG. 1 shows a gas turbine engine 10. As known, a fan section 11 moves air and rotates about an axial center line 12. A compressor section 13, a combustion section 14, and a turbine section 15 are also centered on the axial center line 12. FIG. 1 is a highly schematic view, however, it does show the main components of the gas turbine engine. Further, while a particular type of gas turbine engine is illustrated in this figure, it should be understood that the present invention extends to other types of gas turbine engines.

Figure 2:
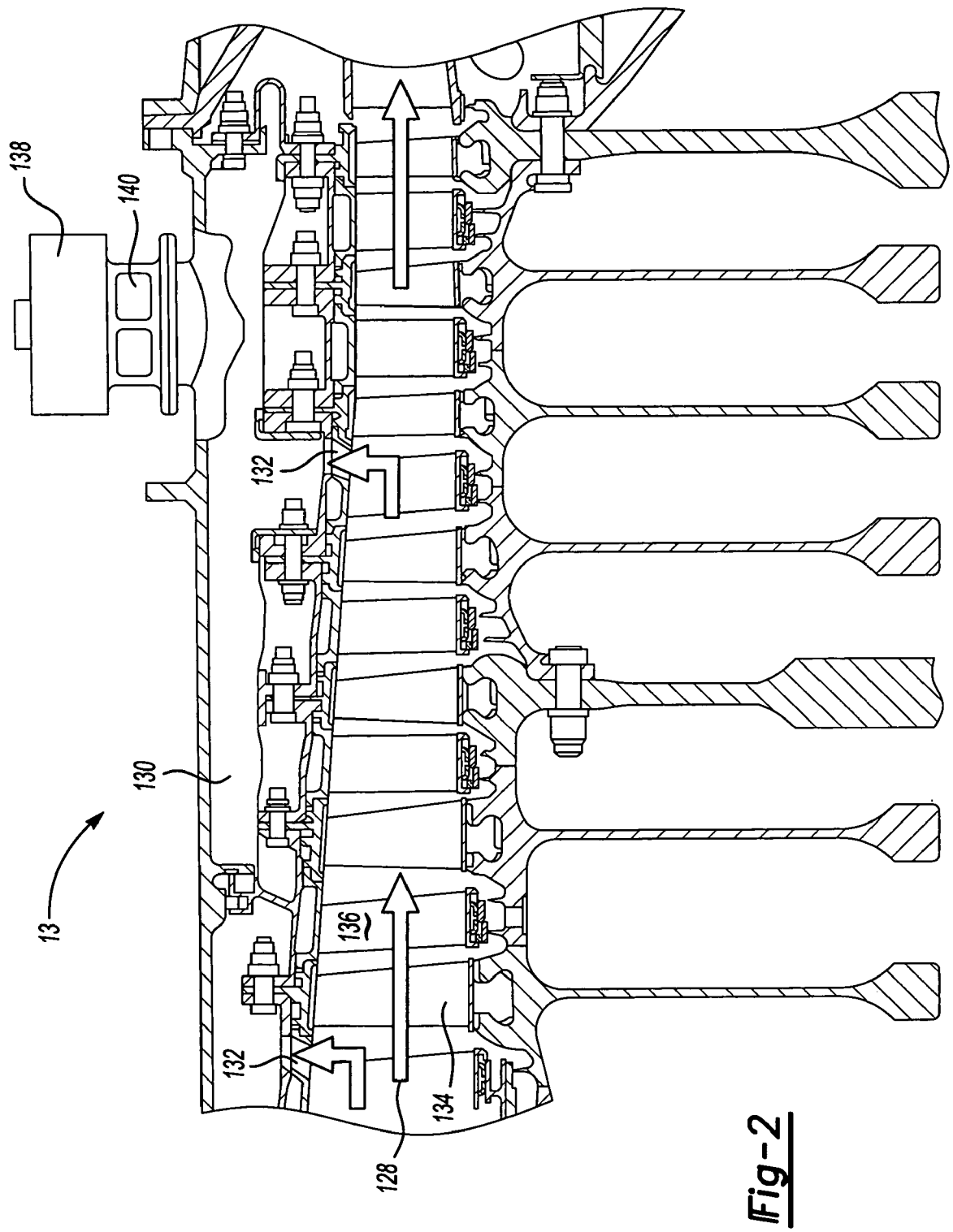
FIG. 2 is a partial cross-sectional view of a portion of a compressor section in a gas turbine engine.

FIG. 2 shows the compressor section 13 having a plurality of rotating compressor blades 134 and fixed vanes 136 in a compressor gas path. A secondary air plenum 130 is positioned outwardly of the compressor blades. Compressed air flows through openings 132 into chamber 130. As shown, a compressed gas flow path 128 passes along the compressor section, and downstream into the gas turbine engine as shown more generally in FIG. 1. A bleed valve 138 has openings 140 that dump air from the chamber 130. This bleed valve is in the open position at start-up conditions, and thus reduces the load on the compressor during start-up.

Figure 3:
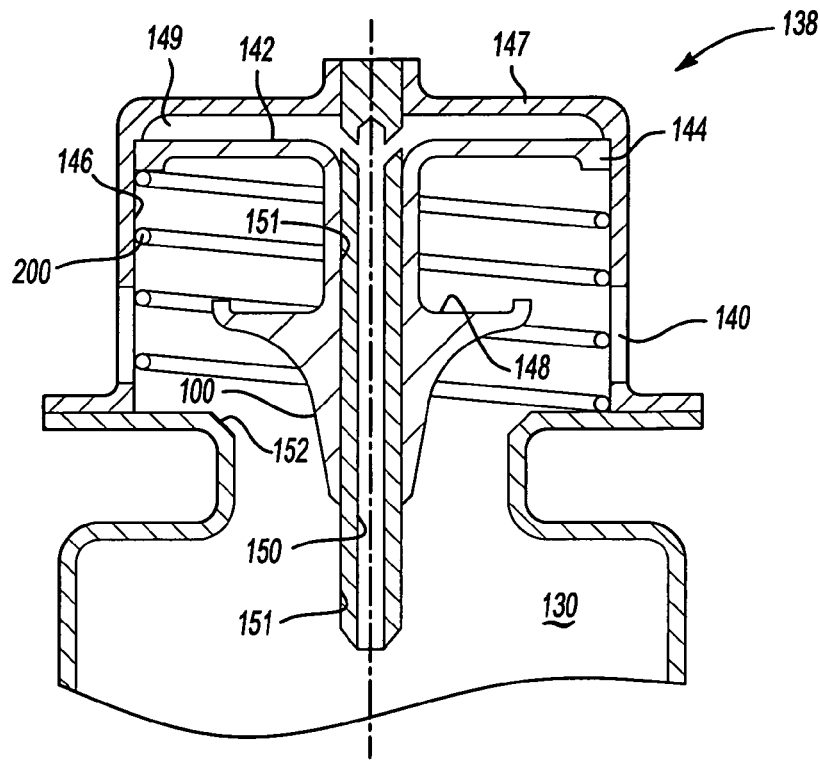
FIG. 3 is a cross-sectional view through an inventive bleed valve in an open position.

As shown in FIG. 3, the valve 138 incorporates a valve poppet with an enlarged piston surface 142 having a radially outer surface 144 seating against an inner surface 146 of a housing 147. Thus, a chamber 149 is defined between the housing 147 and piston surface 142. Chamber 149 is sealed other than communication through a port 150 in a hollow guide rod 151. As can be seen, a spring 200 biases the valve poppet toward the enclosed chamber 149.

A lower piston surface 148 has a generally curved aerodynamic flow surface 100 facing the chamber 130. Surface 100 guides air toward the openings 140 when the piston is in the open position such as shown in FIG. 3.

As can be appreciated from the figure, the surface 100 is curved from generally moving an axial direction towards the enclosed chamber at locations spaced further from the enclosed chamber and then bends air flow more radially outwardly towards the openings 140. The openings 140 are located between the piston surface 148 and the piston surface 142, when the piston is in a closed position. Other shapes can be used for the surface 100, including conical or even flat shapes. As can also be appreciated, the piston surface 148 seats against a smaller neck portion of the housing. The smaller neck portion of the housing leads into an enlarged chamber which communicates the air to the openings 140.

At lower pressure conditions, there is a force from a static pressure within the chamber 149 that is applied to the relatively large area of the piston surface 142. There is also a force from the total pressure (static and dynamic pressure) on the face 100 of the piston surface 148. Also, a spring force from spring 200 urges the valve poppet to the open position. The spring force plus the force from the total pressure applied across the piston surface 148 overcomes the force from the static pressure within the chamber 149 across piston surface 142. Thus, and even though the piston surface 148 has a smaller surface area than the piston surface 142, the valve poppet will be maintained in this open position. Air within the chamber 130 can bleed through the openings 140.

Figure 4:
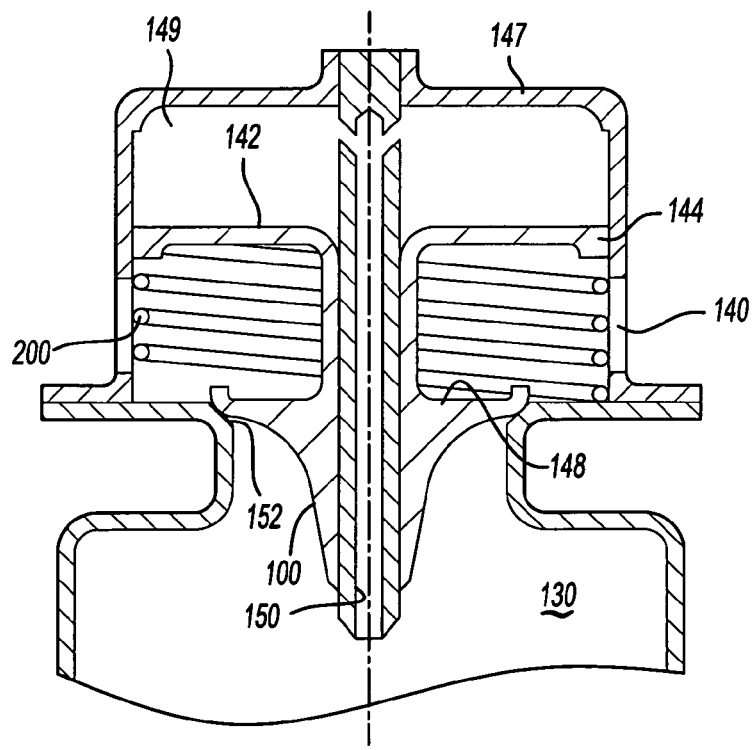
FIG. 4 is a cross-sectional view through an inventive bleed valve in a closed position.

However, as the pressure increases, the force from the pressure within the chamber 149 over piston surface 142 becomes more and more dominant compared to the force from the total pressure on the piston surface 148 plus the spring force 200. At some point, this pressure applied across the greater area of piston surface 142 creates a force that moves the valve poppet to the closed position as shown in FIG. 4. Thus, at start-up and lower pressure conditions, the valve will open and allow the bleeding of the air to reduce the load to drive the compressor. However, once the compressor has reached operational pressures, the piston is driven to the closed position as shown in FIG. 4, and the gas turbine engine can operate as designed.

The pressure at which the valve poppet will snap to the closed position can be controlled by selecting the area size on the two piston surfaces 142 and 148 and the spring 200 force.

While a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:

a fan section, a combustion section, a turbine section, and a compressor section; and said, compressor section being provided with a bleed valve, said bleed valve being movable between open and closed positions, and said bleed valve dumping air compressed by said compressor section in said open position, and blocking flow of air when in the closed position, said bleed valve moving between the open and closed positions dependent on a pressure within the compressor section, at a location of said bleed valve, said bleed valve has an enclosed chamber with a valve poppet having an enlarged piston surface facing said enclosed chamber, and a smaller piston surface facing the compressor section, a force difference on said enlarged piston surface and said smaller piston surface allowing said valve poppet to remain at said open position under lower compressed air pressures, and said force difference moving said valve poppet to the closed position at higher compressed air pressures.

2. The gas turbine engine as set forth in claim 1, wherein a hollow guide rod is fixed to a housing and extends through the valve poppet, said hollow guide rod having a central bore to communicate pressurized gas into said enclosed chamber, and said hollow guide rod also serving as a guide to guide movement of said valve poppet.

3. The gas turbine engine as set forth in claim 2, wherein said central bore communicating with radially outwardly extending passages to communicate said central bore to said enclosed chamber.

4. The gas turbine engine as set forth in claim 1, wherein said smaller piston surface has a curved surface guiding air toward openings in a housing for the bleed valve.

5. The gas turbine engine as set forth in claim 4, wherein said curved surface extending in an axial direction toward said enclosed chamber at locations spaced further from said enclosed chamber, and then bending air flow more radially outwardly toward said openings.

6. The gas turbine engine as set forth in claim 5, wherein said openings are located intermediate said smaller piston surface and said enlarged piston surface when said valve poppet is in said closed position.

7. The gas turbine engine as set forth in claim 1, wherein openings to communicate air away from the compressor section are located intermediate said smaller piston surface and said enlarged piston surface when said valve poppet is in said closed position.

8. The gas turbine engine as set forth in claim 1, wherein said smaller piston surface seating against a smaller neck portion of a housing for said bleed valve, said smaller neck portion leading into an enlarged chamber which includes said openings.

9. The gas turbine engine as set forth in claim 1, wherein a spring force biases said valve poppet to said open position.

10. A compressor for a gas turbine engine comprising:

a compressor having a plurality of compressor rotors for compressing air, and delivering air downstream toward an outlet, a bleed valve at an intermediate location along said plurality of compressor rotors; and the bleed valve including a valve poppet movable between open and closed positions, and the valve poppet dumping air compressed by a compressor in said open position, and blocking flow of air when in the closed position, said valve poppet moving between the open and closed positions dependent on a pressure within the compressor at the location of said bleed valve, the bleed valve has an enclosed chamber with the valve poppet having an enlarged piston surface facing said enclosed chamber, and a smaller piston surface facing the compressor section, a force difference on said enlarged piston surface and said smaller piston surface allowing said valve poppet to remain at said open position under lower compressed air pressures, and said force difference moving said valve poppet to the closed position at higher compressed air pressures.

11. The compressor as set forth in claim 10, wherein a hollow guide rod is fixed to a housing and extends through the valve poppet, said hollow guide rod having a central bore to communicate pressurized gas into said enclosed chamber, and said hollow guide rod also serving as a guide to guide movement of said valve poppet.

12. The compressor as set forth in claim 11, wherein said central bore communicating with radially outwardly extending passages to communicate said central bore to said enclosed chamber.

13. The compressor as set forth in claim 10, wherein said smaller piston surface has a curved surface guiding air toward openings in a housing for the bleed valve.

14. The compressor as set forth in claim 13, wherein said curved surface extending in an axial direction toward said enclosed chamber at locations spaced further from said enclosed chamber, and then bending air flow more radially outwardly toward said openings.

15. The compressor as set forth in claim 14, wherein said openings are located intermediate said smaller piston surface and said enlarged piston surface when said valve poppet is in said closed position.

16. The compressor as set forth in claim 10, wherein openings to communicate away from the compressor section are located intermediate said smaller piston surface and said enlarged piston surface when said valve poppet is in said closed position.

17. The compressor as set forth in claim 10, wherein said smaller piston surface seating against a smaller neck portion of a housing for said bleed valve, said smaller neck portion leading into an enlarged chamber which includes said openings.

18. The compressor as set forth in claim 10, wherein a spring biases said valve poppet to said open position.

19. The gas turbine engine as set forth in claim 1, wherein the force difference on said bleed valve being provided by the surface areas of said enlarged piston surface and said smaller piston surface, as air delivered to said enclosed chamber is from the same location as the air facing the smaller piston surface.

20. The compressor as set forth in claim 10, wherein the force difference on said bleed valve being provided by the surface areas of an enlarged piston surface and a smaller piston surface, as air delivered to an enclosed chamber is from the same location as the air facing the smaller piston surface.

* * * * *